United States Patent
Elgaafary et al.

(10) Patent No.: US 11,954,234 B2
(45) Date of Patent: *Apr. 9, 2024

(54) SYSTEM AND METHOD FOR PROTECTING BROWSER DATA

(71) Applicant: UAB 360 IT, Vilnius (LT)

(72) Inventors: Mohamed Adly Amer Elgaafary, Vilnius (LT); Aleksandr Ševčenko, Vilnius (LT)

(73) Assignee: UAB 360 IT, Vilnius (LT)

( * ) Notice: Subject to any disclaimer, the term of this patent is extended or adjusted under 35 U.S.C. 154(b) by 0 days.

This patent is subject to a terminal disclaimer.

(21) Appl. No.: 17/994,978

(22) Filed: Nov. 28, 2022

(65) Prior Publication Data

US 2023/0267232 A1 Aug. 24, 2023

Related U.S. Application Data

(63) Continuation of application No. 17/677,061, filed on Feb. 22, 2022, now Pat. No. 11,531,784.

(51) Int. Cl.
| | |
|---|---|
| *G06F 21/62* | (2013.01) |
| *G06F 16/9538* | (2019.01) |
| *G06F 21/31* | (2013.01) |
| *G06F 21/60* | (2013.01) |
| *H04L 9/06* | (2006.01) |

(52) U.S. Cl.
CPC ........ *G06F 21/629* (2013.01); *G06F 16/9538* (2019.01); *G06F 21/31* (2013.01); *G06F 21/602* (2013.01); *H04L 9/0631* (2013.01)

(58) Field of Classification Search
None
See application file for complete search history.

(56) References Cited

U.S. PATENT DOCUMENTS

| | | | | |
|---|---|---|---|---|
| 8,132,242 | B1* | 3/2012 | Wu | H04L 63/0884 |
| | | | | 713/168 |
| 8,316,460 | B1* | 11/2012 | Wang | G06F 21/6209 |
| | | | | 726/28 |
| 8,407,768 | B1* | 3/2013 | Hayter | H04L 63/0853 |
| | | | | 726/5 |
| 8,627,077 | B2* | 1/2014 | Herbach | G06Q 20/3674 |
| | | | | 713/168 |
| 8,973,137 | B1* | 3/2015 | Oliver | H04W 12/128 |
| | | | | 726/25 |
| 9,213,836 | B2* | 12/2015 | Mayer | G06F 21/56 |
| 9,477,825 | B1* | 10/2016 | Sinchak | H04L 63/08 |
| 9,632,851 | B1* | 4/2017 | Johansson | G06F 3/0482 |
| 2002/0162003 | A1* | 10/2002 | Ahmed | H04L 63/12 |
| | | | | 713/176 |
| 2011/0016534 | A1* | 1/2011 | Jakobsson | H04L 67/535 |
| | | | | 726/28 |

(Continued)

*Primary Examiner* — James R Turchen
(74) *Attorney, Agent, or Firm* — Moser Taboada

(57) ABSTRACT

A method for controlling access to process data includes encrypting process data of a process; receiving a request to access the process data; requesting a security code to access the encrypted process data; receiving the security code; authenticating the received security code; and granting access to the encrypted process data if the received security code is successfully authenticated and denying access to the encrypted process data if the received security code is not successfully authenticated.

18 Claims, 4 Drawing Sheets

(56) References Cited

U.S. PATENT DOCUMENTS

| | | | |
|---|---|---|---|
| 2012/0047451 A1* | 2/2012 | Marmaros | G06F 16/955 709/217 |
| 2012/0240237 A1* | 9/2012 | Kanevsky | G06F 16/957 726/26 |
| 2015/0040067 A1* | 2/2015 | Ma | G06F 16/957 715/810 |
| 2017/0180335 A1* | 6/2017 | Quinlan | H04L 63/0815 |
| 2018/0159843 A1* | 6/2018 | Sajja | H04L 9/0894 |
| 2019/0379540 A1* | 12/2019 | Liderman | G06F 21/33 |
| 2019/0386971 A1* | 12/2019 | Venkiteswaran | H04L 67/146 |

\* cited by examiner

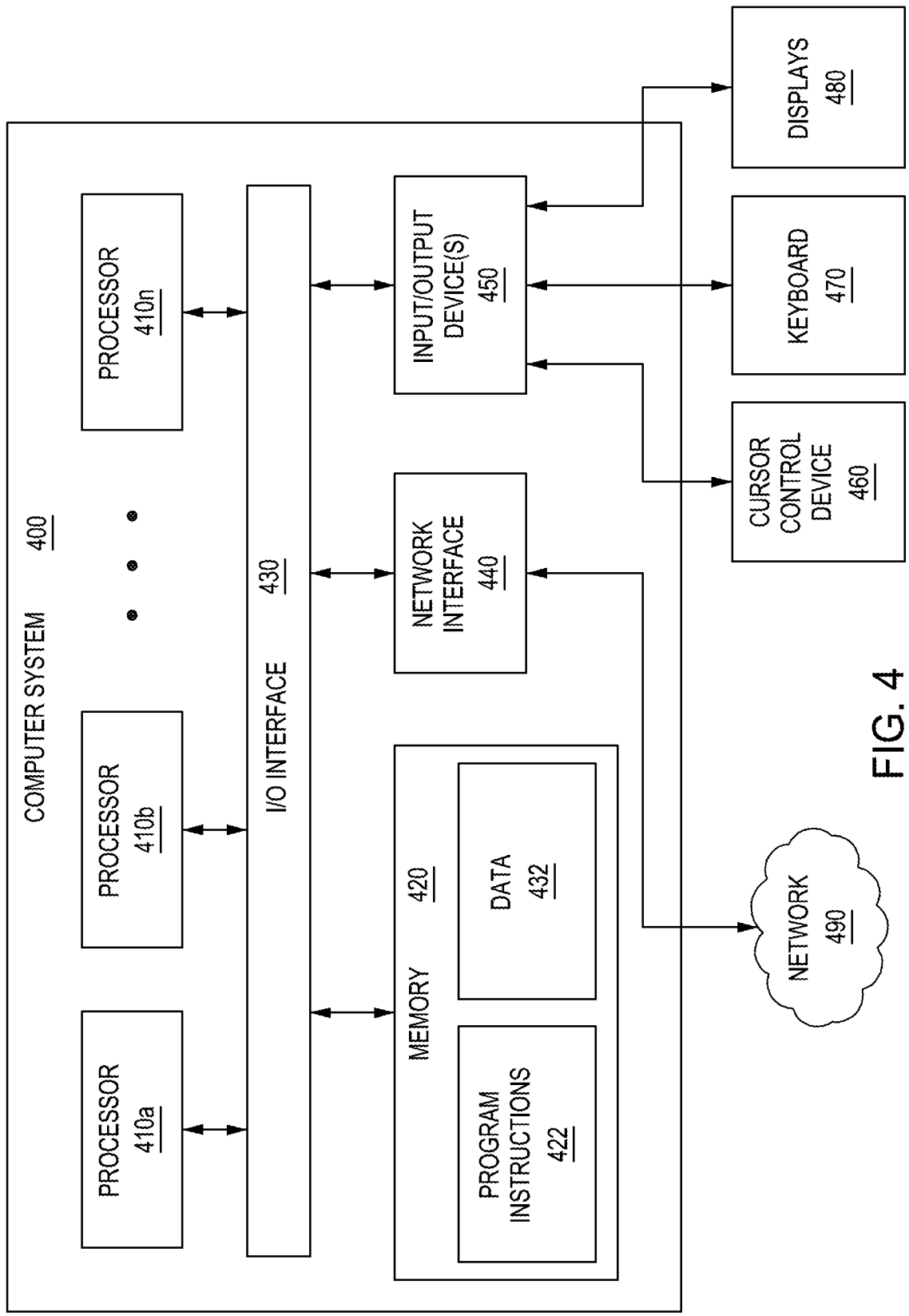

SYSTEM AND METHOD FOR PROTECTING BROWSER DATA

CROSS-REFERENCE TO RELATED APPLICATIONS

This application is a Continuation of and claims benefit of and priority to U.S. patent application Ser. No. 17/677,061 filed Feb. 22, 2022, which is herein incorporated by reference in its entirety.

FIELD

The present disclosure relates generally to Internet security protocols, and more particularly to a system and method for protecting process data, such as browser data.

BACKGROUND

Each browser on a user device keeps a database with sensitive data, like browsing history and login information, saved cookies, et al. For compatibility and user experience (UX) reasons, browsers share this information with other browsers. For example, if the user downloads a new browser, they are given an option to retrieve information (credentials, browsing history, etc.) from the previously used browser. This accessibility, however, creates a vulnerability since a malicious agent can pretend to be another browser and extract the sensitive data.

Therefore, there is a need for systems and methods for protecting data, such as browser data, from illicit access.

SUMMARY

According to one embodiment, a method for controlling access to process data includes: encrypting process data of a process; receiving a request to access the process data; requesting a security code to access the encrypted process data; receiving the security code; authenticating the received security code; and granting access to the encrypted process data if the received security code is successfully authenticated and denying access to the encrypted process data if the received security code is not successfully authenticated. According to another embodiment, a method for controlling access to process data includes: selecting a process; selecting a process data associated with the process; entering the process in a list of approved processes; encrypting the process data; receiving a request to access the process data; determining whether the requested process data is associated with a process entered in the list of approved processes; and denying access to the requested process data if it is determined that the requested process data is associated with a process that is not entered in the list of approved processes and granting access to the requested process data if it is determined that the requested process data is associated with a process that is entered in the list of approved processes.

According to yet another embodiment, a non-transitory computer readable medium having instructions stored thereon, which, when executed by the at least one processor, causes the at least one processor to perform a method for controlling access to process data includes: encrypting process data of a process; receiving a request to access the process data; requesting a security code to access the encrypted process data; receiving the security code; authenticating the received security code; and granting access to the encrypted process data if the received security code is successfully authenticated and denying access to the encrypted process data if the received security code is not successfully authenticated.

Other and further embodiments in accordance with the present principles are described below.

BRIEF DESCRIPTION OF THE DRAWINGS

So that the manner in which the above recited features of the present principles can be understood in detail, a more particular description of the principles, briefly summarized above, may be had by reference to embodiments, some of which are illustrated in the appended drawings. It is to be noted, however, that the appended drawings illustrate only typical embodiments in accordance with the present principles and are therefore not to be considered limiting of its scope, for the principles may admit to other equally effective embodiments.

FIG. 4 depicts a high-level block diagram of a computing device suitable for use with embodiments of a system for protecting browsing data in accordance with at least one embodiment of the present disclosure.

Figure 1:
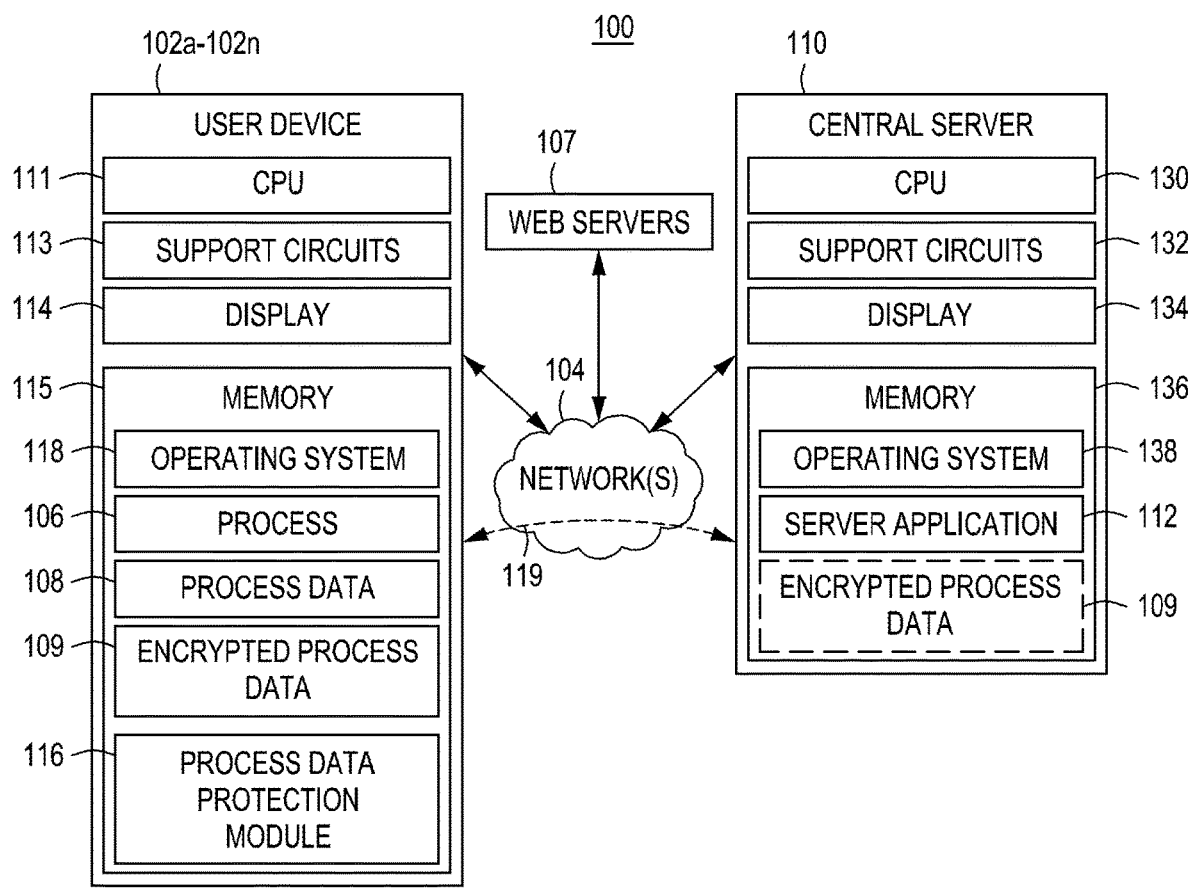
FIG. 1 depicts a block diagram of a computer system for protecting browsing data in accordance with at least one embodiment of the present disclosure.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

The following detailed description describes techniques (e.g., methods, processes, apparatuses, and systems) for protecting browser data. While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims.

Embodiments consistent with the present disclosure protect process data, such as browser data. In some embodiments, the process (e.g., browser) is patched, and the process and its process data (e.g., browser data) are encrypted. When a process requests access to the encrypted process data (e.g., browser data), a PIN or similar security code is requested before the process data (e.g., browser data) is decrypted. Thus, only trusted processes may access the process data (e.g., browser data), thereby protecting the process data from illicit access. In one embodiment, a driver locks the process data (e.g., browser data), and only approved processes can access the locked data.

Thus, methods and systems consistent with embodiments of the present disclosure protect process data from illicit access. Details of such methods and apparatuses are described in detail below with respect to the figures.

FIG. 1 illustrates an example of a computer system 100 for protecting process (e.g., browser data) in accordance with at least one embodiment of the disclosure. In FIG. 1, the system 100 comprises at least one user device 102, a server 110, and a computer network 104, (e.g., the Internet) connecting the server 110 to the user devices 102. The general structure of such a server 110 and/or user device 102 is described in detail below with respect to FIG. 4.

The system 100 includes a plurality of user devices 102a-n, a centralized server 110, and a plurality of web servers 107 (one is shown in FIG. 1) communicatively coupled via one or more networks 104. In embodiments, the centralized server 110 is configured to communicate with the user devices 102a-n via communication 119.

The networks 104 comprise one or more communication systems that connect computers by wire, cable, fiber optic, and/or wireless link facilitated by various types of well-known network elements, such as hubs, switches, routers, and the like. The networks 104 may include an Internet Protocol (IP) network, a public switched telephone network (PSTN), or other mobile communication networks, and may employ various well-known protocols to communicate information amongst the network resources.

The end-user device or edge device (also referred throughout as "user device") 102 comprises a Central Processing Unit (CPU) 111, support circuits 113, display device 114, and memory 115. The CPU 111 may comprise one or more commercially available microprocessors or microcontrollers that facilitate data processing and storage. The various support circuits 113 facilitate the operation of the CPU 111 and include one or more clock circuits, power supplies, cache, input/output circuits, and the like. The memory 115 comprises at least one of Read Only Memory (ROM), Random Access Memory (RAM), disk drive storage, optical storage, removable storage and/or the like. In some embodiments, the memory 115 comprises an operating system 118, process (e.g., web browser) 106, process data 108, encrypted process data 109, and a process (e.g., browser) data protection module 116.

The centralized server 110 comprises a Central Processing Unit (CPU) 130, support circuits 132, display device 134, and memory 136. The CPU 130 may comprise one or more commercially available microprocessors or microcontrollers that facilitate data processing and storage. The various support circuits 132 facilitate the operation of the CPU 130 and include one or more clock circuits, power supplies, cache, input/output circuits, and the like. The memory 136 comprises at least one of Read Only Memory (ROM), Random Access Memory (RAM), disk drive storage, optical storage, removable storage and/or the like. In some embodiments, the memory 136 comprises an operating system 138. In some embodiments, the memory 136 includes a server application 112. The central server 110 is a centralized computing device used to execute a server application 112. In some embodiments, the server application 112 causes the server 110 to communicate encrypted process data 109 between the central server 110 and user devices 102. Thus, in some embodiments, the encrypted process data 109 may be stored on user devices 102 and/or on the central server 110. Also, in some embodiments, the server application 112 performs some or all of the same operations as the process data protection module 116 (discussed in greater detail below), allowing for distributed processing on the central server 110. Thus, in some embodiments, access to encrypted process data 109, and, therefore, process data 108, may be controlled, at least in part by the central server 110.

The operating system (OS) 118 generally manages various computer resources (e.g., network resources, file processors, and/or the like). The operating system 118 is configured to execute operations on one or more hardware and/or software modules, such as Network Interface Cards (NICs), hard disks, virtualization layers, firewalls and/or the like. Examples of the operating system 118 may include, but are not limited to, various versions of LINUX, MAC OSX, BSD, UNIX, MICROSOFT WINDOWS, IOS, ANDROID and/or the like.

User devices 102a, 102b, 102c . . . 102N (collectively referred to as user devices 102) communicate through network 104 with the server 110. In some embodiments, user devices 102 can be any computing devices capable of hosting a client application (browser) 106 and storing process (e.g., browser) data 108. User devices 102 can comprise any devices connected to a network, including, for example, a laptop, a mobile phone, a tablet computer, a desktop computer, a smart device, a router, and other network devices. Each user device 102 comprises a memory storing a process such as a process (e.g., browser) 106, process data 108 such as browser data, and a process data protection module 116 for protecting the process data 108. In an embodiment, the process 106 may be a browser. A browser is a well-known application for accessing and displaying web page content. Commercially available browsers include, but are not limited to, Safari®, Chrome®, Internet Explorer®, Firefox®, etc. Browser data 108 may include a database or memory storage of sensitive data such as browsing history, login information, saved cookies, etc.

The process data protection module 116 is configured to perform the methods for protecting access to the process data 108, as discussed in greater detail below. In some embodiments, the process data protection module 116 may be a driver application or program that can run as a process that is launched that then monitors the configuration of the process data so that only the process associated with the process data can access the process data created by the process and not other applications or processes.

Figure 2:
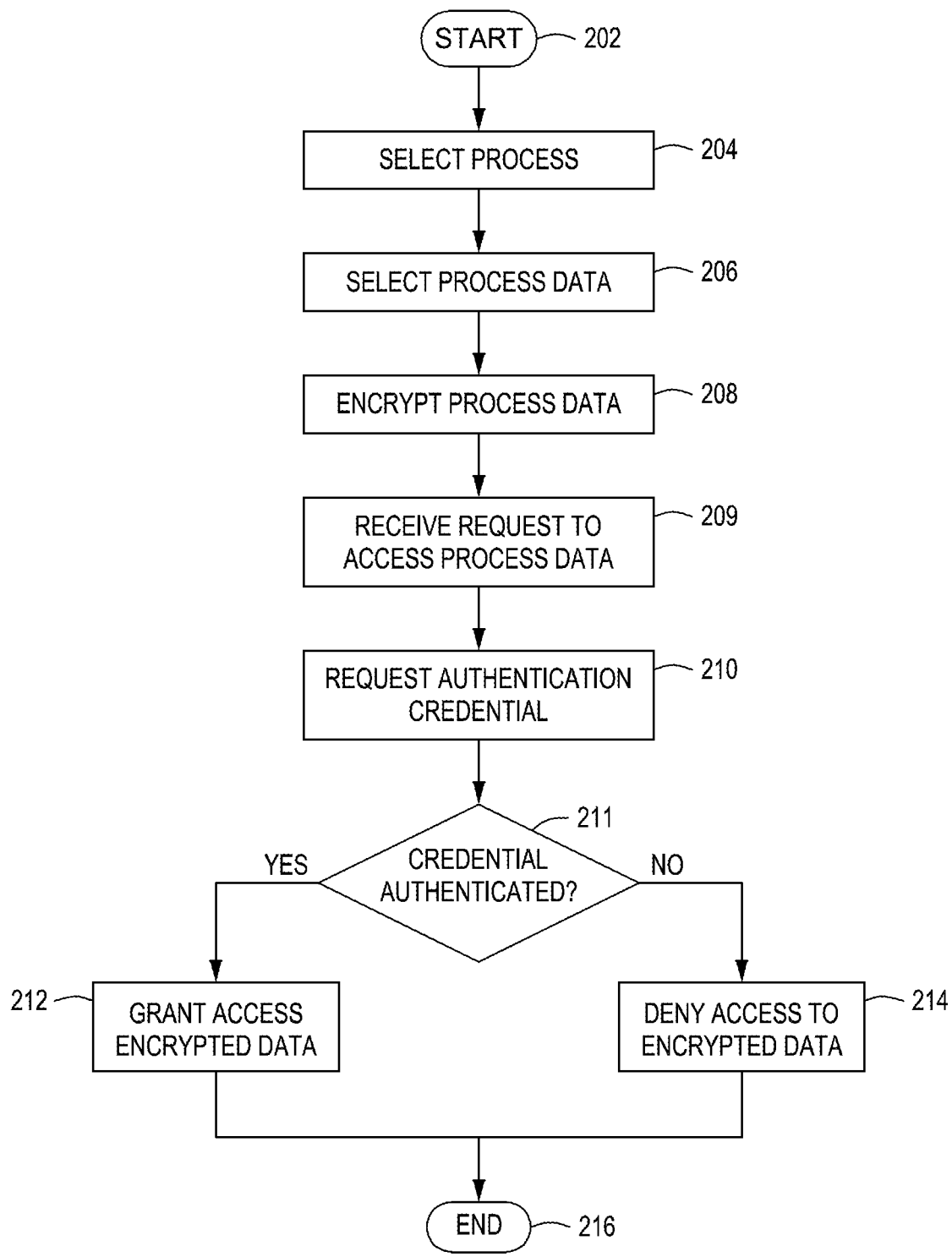
FIG. 2 is a flow diagram of a method for protecting browsing data in accordance with at least one embodiment of the present disclosure.

FIG. 2 depicts a block diagram of the method 200 for protecting process data (e.g., browser data) by the system 100 of FIG. 1 in accordance with at least one embodiment of the present disclosure. In some embodiments, the process is a browser, and the process data includes at least one of a browser configuration file, a browser model, or a browser version. For purposes of illustration and discussion, the method 200 will be described in the context of an exemplary embodiment where the process 106 is a browser and the process data 108 is browser data associated with the browser. However, such description is merely exemplary. Indeed, it will be appreciated that the concepts described herein may broadly be applied to any number of programs or processes on a user device that use associated process data.

The method 200 begins at 202 whereupon the user device 102 has the process (e.g., browser) 106 installed and process (e.g., browser) data 108 stored. At step 204 the process 106 is selected. At step 206 the process data 108 associated with the process 106 is selected. At step 208 the process data is encrypted as encrypted process data 109 and stored. The encryption of the process data 208 may be done through the Advanced Encryption Standard (AES). Other forms of encryption include, but are not limited to, Rivest-Shamir-Adlemand (RSA), Elliptic Curve, or the Data Encryption Standard (DES).

At step 209, a request to access the process data 108 is received. The request to access the process data 108 may be from the process 106 itself to access the process data 108 or from another application or process requesting access to the process data 108. In the former case, if the process data 108 is encrypted, the process 106 may be patched (e.g., to have a browser add-in or extension that allows the browser) to decrypt the encrypted process data 109 and use the process' 106 (e.g., browser's) own configuration. In the latter case, for example, upon installation and execution of another web browser on the user device 102, such other web browser may request access to the browser data for initial setup and configuration.

Regardless of the source or circumstances giving rise to the request for access to the process data 108, at step 210 an authentication credential is requested. At step 211, an authentication process is performed. In some embodiments, an authentication credential is authenticated. Such authentication credential may include at least one of a PIN, password, security question, or code.

If the authentication is successful (YES at step 211), then access to the encrypted process data 109 is granted and the encrypted process data 109 is decrypted. Otherwise, if the authentication is not successful (NO) at step 211, then access to the encrypted process data 109 is denied and the encrypted process data 109 remains encrypted. Authentication may be unsuccessful if the PIN or code is wrong or if no PIN or code is entered. The method 200 ends at 216.

In some embodiments, upon receipt of a request at step 209, a threat assessment of the request may be performed. Such an assessment may include noting the source of the request for access, how many times that source has requested access to the process data 108, and the time of the request. Upon receipt of a request considered a potential risk based on the threat assessment, a threat notification may be displayed to the user along with the request for the required security code for authentication used at step 210.

In some embodiments, if an incorrect security code is received (NO at step 210) in response to a request to access the process data 108, a threat value will be given to the requesting process, that alerts the user to a potential security threat to the process data 108. If an incorrect PIN, password, security question, or authentication is received multiple times, the process data 108 may be locked to prevent illicit access until the system is reset.

Optionally, in some embodiments, the server application 112 may cause the central server 110 to communicate encrypted process data 109 between the central server 110 and user devices 102. Thus, in embodiments, the process data 108 encrypted in step 208, may be transmitted to the central server 110 and stored as encrypted process data 109 on the central server 110. Also, in embodiments, requests received to access process data 108 at step 210 may be communicated via communication 119 to the central server 110, which can, in turn, send a request for authentication to the user device 102 via communication 119. Also, steps 211-216 may be performed by the server application 112 to grant or deny access to the encrypted process data 109. A permission granted or denied response can be communicated via communication 119 from the central server 110 to the user device 102. If permission is granted, the user device 102 can decrypt the encrypted process data 109.

Figure 3:
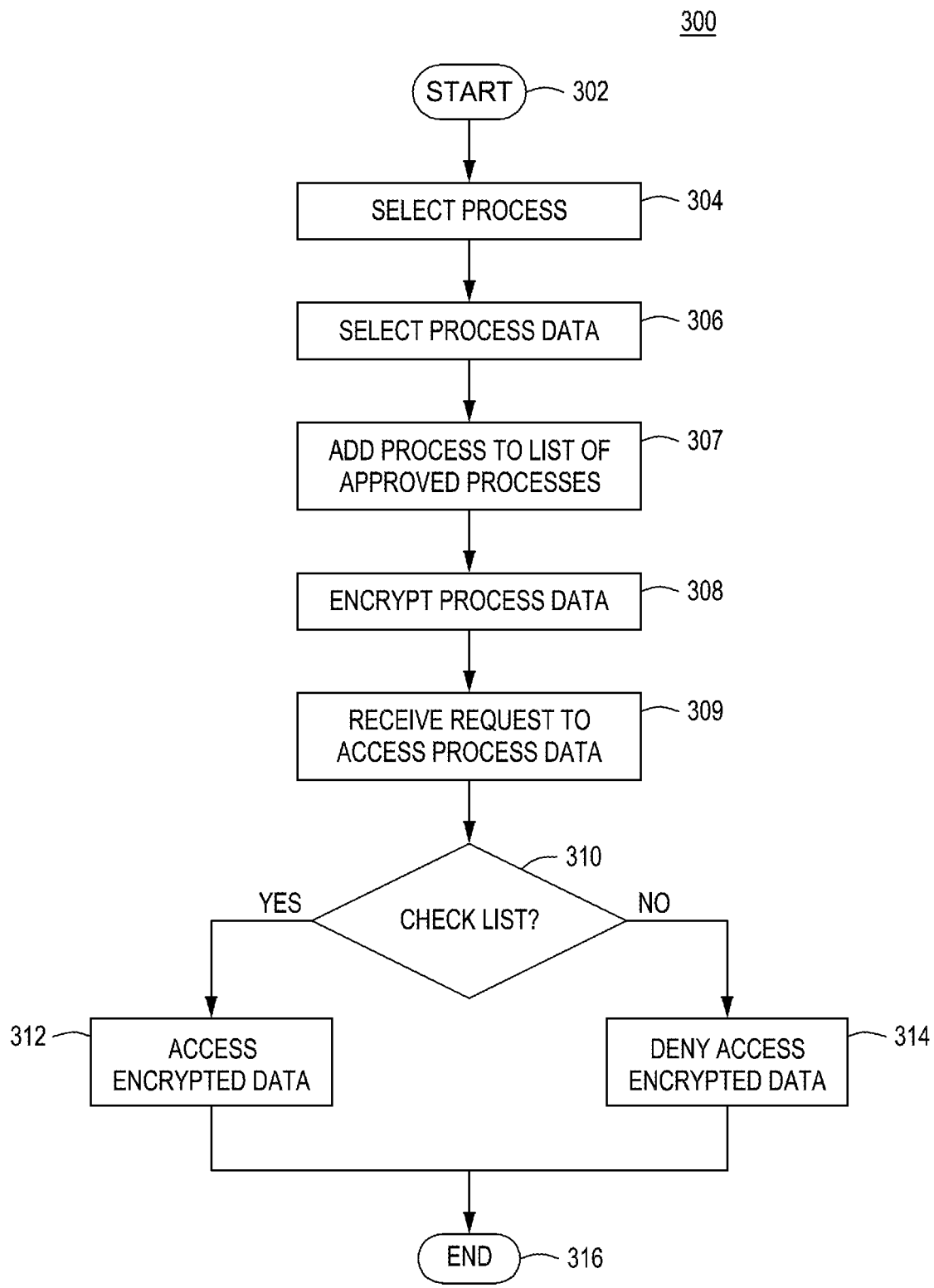
FIG. 3 is a flow diagram of a method for protecting browsing data in accordance with at least one embodiment of the present disclosure.

FIG. 3 depicts a block diagram of a method 300 for protecting process data by the system 100 of FIG. 1 in accordance with another embodiment of the present disclosure. The method begins at step 302 whereupon the process (e.g., browser 106) and the process data (e.g., browser data 108) are stored in memory of the user device 102. At step 304 the process is selected. At step 306 the process data associated with the selected process is selected. At step 307, the selected process is added to a list of approved processes. At step 308, the associated process data is encrypted. At step 309 a request to access the process data is received. At step 310, an authentication is performed by checking the list of approved processes. Thus, at step 312 if the process data requested is associated with a process on the list of approved processes (YES at step 310), then access to the encrypted process data is permitted and the process data is decrypted. Otherwise, at step 314 if the process data requested is not associated with a process on the list of approved processes (NO at step 310), then access to the encrypted process data is denied and the process data remains decrypted. The encryption of the process data 308 may be done through the Advanced Encryption Standard (AES). Other forms of encryption include, but are not limited to, Rivest-Shamir-Adlemand (RSA), Elliptic Curve, or the Data Encryption Standard (DES).

FIG. 4 depicts a computer system 400 that can be utilized in various embodiments of the present disclosure to implement the computer and/or the display, according to one or more embodiments.

Various embodiments of method and system for generating a dynamic secure certificate, as described herein, may be executed on one or more computer systems, which may interact with various other devices. One such computer system is computer system 400 illustrated by FIG. 4, which may in various embodiments implement any of the elements or functionality illustrated in FIGS. 1-3. In various embodiments, computer system 400 may be configured to implement methods described above. The computer system 400 may be used to implement any other system, device, element, functionality and/or method of the above-described embodiments. In the illustrated embodiments, computer system 400 may be configured to implement the user devices 102 and server 110 and implement the methods 200 and 300 as processor-executable executable program instructions in various embodiments.

In the illustrated embodiment, computer system 400 includes one or more processors 410a-410n coupled to a system memory 420 via an input/output (I/O) interface 430. Computer system 400 further includes a network interface 440 coupled to I/O interface 430, and one or more input/output devices 450, such as cursor control device 460, keyboard 470, and display(s) 480. In various embodiments, any of the components may be utilized by the system to receive user input described above. In various embodiments, a user interface may be generated and displayed on display 480. In some cases, it is contemplated that embodiments may be implemented using a single instance of computer system 400, while in other embodiments multiple such systems, or multiple nodes making up computer system 400, may be configured to host different portions or instances of various embodiments. For example, in one embodiment some elements may be implemented via one or more nodes of computer system 400 that are distinct from those nodes implementing other elements. In another example, multiple nodes may implement computer system 400 in a distributed manner.

In different embodiments, computer system 400 may be any of various types of devices, including, but not limited to, a personal computer system, desktop computer, laptop, notebook, tablet or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 400 may be a uniprocessor system including one processor 410, or a multiprocessor system including several processors 410 (e.g., two, four, eight, or another suitable number). Processors 410 may be any suitable processor capable of executing instructions. For example, in various embodiments processors 410 may be general-purpose or embedded processors implementing any of a variety of instruction set architectures (ISAs). In multiprocessor systems, each of the processors 410 may commonly, but not necessarily, implement the same ISA.

System memory 420 may be configured to store program instructions 422 and/or data 432 accessible by processor 410. In various embodiments, system memory 420 may be implemented using any non-transitory computer readable media including any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 420. In other embodiments, program instructions and/or data may be received, sent or stored upon different types of computer-accessible media or on similar media separate from system memory 420 or computer system 400.

In one embodiment, I/O interface 430 may be configured to coordinate I/O traffic between processor 410, system memory 420, and any peripheral devices in the device, including network interface 440 or other peripheral interfaces, such as input/output devices 450. In some embodiments, I/O interface 430 may perform any necessary protocol, timing or other data transformations to convert data signals from one component (e.g., system memory 420) into a format suitable for use by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. Also, in some embodiments some or all of the functionality of I/O interface 430, such as an interface to system memory 420, may be incorporated directly into processor 410.

Network interface 440 may be configured to allow data to be exchanged between computer system 400 and other devices attached to a network (e.g., network 490), such as one or more external systems or between nodes of computer system 400. In various embodiments, network 490 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 440 may support communication via wired or wireless general data networks, such as any suitable type of Ethernet network, for example; via digital fiber communications networks; via storage area networks such as Fiber Channel SANs, or via any other suitable type of network and/or protocol.

Input/output devices 450 may, in some embodiments, include one or more display terminals, keyboards, keypads, touchpads, scanning devices, voice or optical recognition devices, or any other devices suitable for entering or accessing data by one or more computer systems 400. Multiple input/output devices 450 may be present in computer system 400 or may be distributed on various nodes of computer system 400. In some embodiments, similar input/output devices may be separate from computer system 400 and may interact with one or more nodes of computer system 400 through a wired or wireless connection, such as over network interface 440.

In some embodiments, the illustrated computer system may implement any of the operations and methods described above, such as the methods illustrated by the flowchart of FIGS. 2-3. In other embodiments, different elements and data may be included.

Those skilled in the art will appreciate that computer system 400 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 400 may be transmitted to computer system 400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description on a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner.

Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, and the like defined herein are defined as such for ease of discussion and are not intended to imply that any specific implementation details are required. For example, any of the described modules and/or data structures may be combined or divided into sub-modules, sub-processes or other units of computer code or data as may be required by a particular design or implementation.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

EXAMPLE CLAUSES

A. A method for controlling access to process data comprising:
encrypting process data of a process;
receiving a request to access the process data;
requesting a security code to access the encrypted process data;
receiving the security code;
authenticating the received security code; and
granting access to the encrypted process data if the received security code is successfully authenticated and denying access to the encrypted process data if the received security code is not successfully authenticated.

B. The method according to clause A, wherein the process is a browser.

C. The method according to clause A or B, wherein the process data comprises at least one of a browser model, a browser version, or a browser configuration file.

D. The method according to clauses A-C, wherein the process data is encrypted using AES.

E. The method according to clauses A-D, further comprising performing a threat assessment for the request to access to the process data before requesting the security code.

F. The method according to clauses A-E, wherein performing the threat assessment comprises noting a source associated with the request to access the process data, a time associated with the request to access process data, and how many times access to the process data has been requested by the source.

G. The method according to clauses A-F, wherein a threat notification is displayed to a user before the security code is requested.

H. The method according to clauses A-G, wherein the security code is a PIN.

I. The method according to clauses A-H, further comprising locking the process data upon receipt of more than one denial of access to the requested process data.

J. A method for controlling access to process data comprising:
selecting a process;
selecting a process data associated with the process;
entering the process in a list of approved processes;
encrypting the process data;
receiving a request to access the process data;
determining whether the requested process data is associated with a process entered in the list of approved processes; and
denying access to the requested process data if it is determined that the requested process data is associated with a process that is not entered in the list of approved processes and granting access to the requested process data if it is determined that the requested process data is associated with a process that is entered in the list of approved processes.

K. The method according to clause J, wherein the process data comprises at least one of a browser model, a browser version or a browser configuration file.

L. The method according to clauses J or K, further comprising performing a threat assessment for the request to access the process data before determining whether the requested process data is associated with a process entered in the list of approved processes.

M. The method according to clauses J-L, wherein performing the threat assessment comprises identifying at least one of a source associated with the request to access the process data, a time associated with the request to access the process data, or how many times access to the process data has been requested by the source.

N. The method according to clauses J-M, further comprising displaying a threat notification if it is determined that the requested process data is associated with a process that is entered in the list of approved processes.

O. A non-transitory computer readable medium having instructions stored thereon, which, when executed by the at least one processor, causes the at least one processor to perform a method of controlling access to process data, the method comprising:
encrypting process data of a process;
receiving a request to access the process data;
requesting a security code to access the encrypted process data;
receiving the security code;
authenticating the received security code; and
granting access to the encrypted process data if the received security code is successfully authenticated and denying access to the encrypted process data if the received security code is not successfully authenticated P. The medium according to clause O, wherein the process data comprises at least one of a browser model, a browser version or a browser configuration file.

Q. The medium according to clauses O or P, further comprising performing a threat assessment for the before requesting the security code.

R. The medium according to clauses O-Q, wherein performing the threat assessment includes identifying at least one of a source associated with the request, a time associated with the request, or how many times access to the process data has been requested by the source.

S. The medium according to clauses O-R, wherein a threat notification is displayed to a user before the security code is requested.

T. The medium according to clauses O-S, further comprising locking the process data upon receipt of more than one denial of access to the requested process data.

What is claimed is:

1. A method for controlling access to process data comprising:
encrypting process data of a first process on a user device wherein the process data is patched before the process data is encrypted;
receiving, by the first process, a request from a second process on the user device to access the encrypted process data, the second process being different from the first process;
requesting authentication information from the second process to access the encrypted process data;
receiving authentication information automatically generated by the second process upon the requesting;
authenticating the received authentication information; and
granting the second process access to the encrypted process data if the received authentication information is successfully authenticated and denying the second process access to the encrypted process data if the received authentication information is not successfully authenticated.

2. The method according to claim 1, wherein the first process is a browser.

3. The method according to claim 2, wherein the process data comprises at least one of a browser model, a browser version, or a browser configuration file.

4. The method according to claim 1, further comprising performing a threat assessment for the request to access to the process data before requesting the authentication information.

5. The method according to claim 4, wherein performing the threat assessment comprises noting a source associated with the request to access the process data, a time associated with the request to access the process data, and how many times access to the process data has been requested by the source.

6. The method according to claim 4, wherein a threat notification is displayed to a user before the authentication information is requested.

7. The method according to claim 1, wherein the authentication information is a PIN.

8. The method according to claim 1, further comprising locking the process data upon receipt of more than one denial of access to the requested process data.

9. A non-transitory computer readable medium having instructions stored thereon, which, when executed by the at least one processor, causes the at least one processor to perform a method for controlling access to process data comprising:
encrypting process data of a first process on a user device wherein the process data is patched before the process data is encrypted;
receiving, by the first process, a request from a second process on the user device to access the encrypted process data, the second process being different from the first process;
requesting authentication information from the second process to access the encrypted process data;
receiving authentication information automatically generated by the second process upon the requesting;
authenticating the received authentication information; and
granting the second process access to the encrypted process data if the received authentication information is successfully authenticated and denying the second process access to the encrypted process data if the received authentication information is not successfully authenticated.

10. The non-transitory computer readable medium according to claim 9, wherein the first process is a browser.

11. The non-transitory computer readable medium according to claim 10, wherein the process data comprises at least one of a browser model, a browser version, or a browser configuration file.

12. The non-transitory computer readable medium according to claim 9, further comprising performing a threat assessment for the request to access to the process data before requesting the authentication information.

13. The non-transitory computer readable medium according to claim 12, wherein performing the threat assessment comprises noting a source associated with the request to access the process data, a time associated with the request to access the process data, and how many times access to the process data has been requested by the source.

14. The non-transitory computer readable medium according to claim 12, wherein a threat notification is displayed to a user before the authentication information is requested.

15. The non-transitory computer readable medium according to claim 9, wherein the authentication information is a PIN.

16. The non-transitory computer readable medium according to claim 9, further comprising locking the process data upon receipt of more than one denial of access to the requested process data.

17. A system for controlling access to process data comprising:

at least one user device or a server comprising a processor configured to:

encrypt process data of a first process on a user device wherein the process data is patched before the process data is encrypted;

receive, by the first process, a request from a second process on the user device to access the encrypted process data, the second process being different from the first process;

request authentication information from the second process to access the encrypted process data;

receive authentication information automatically generated by the second process upon the requesting;

authenticate the received authentication information; and grant the second process access to the encrypted process data if the received authentication information is successfully authenticated and denying the second process access to the encrypted process data if the received authentication information is not successfully authenticated.

18. The system of claim 17, wherein the process data is stored on the user device or the server.

\* \* \* \* \*